Oct. 22, 1929.     E. M. RAY     1,732,986
OIL COOLING DEVICE
Filed April 1, 1927
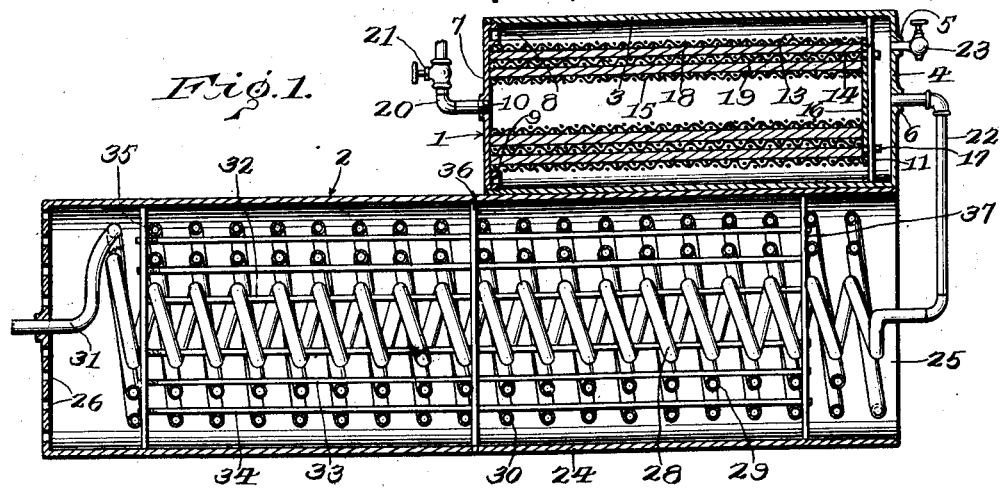
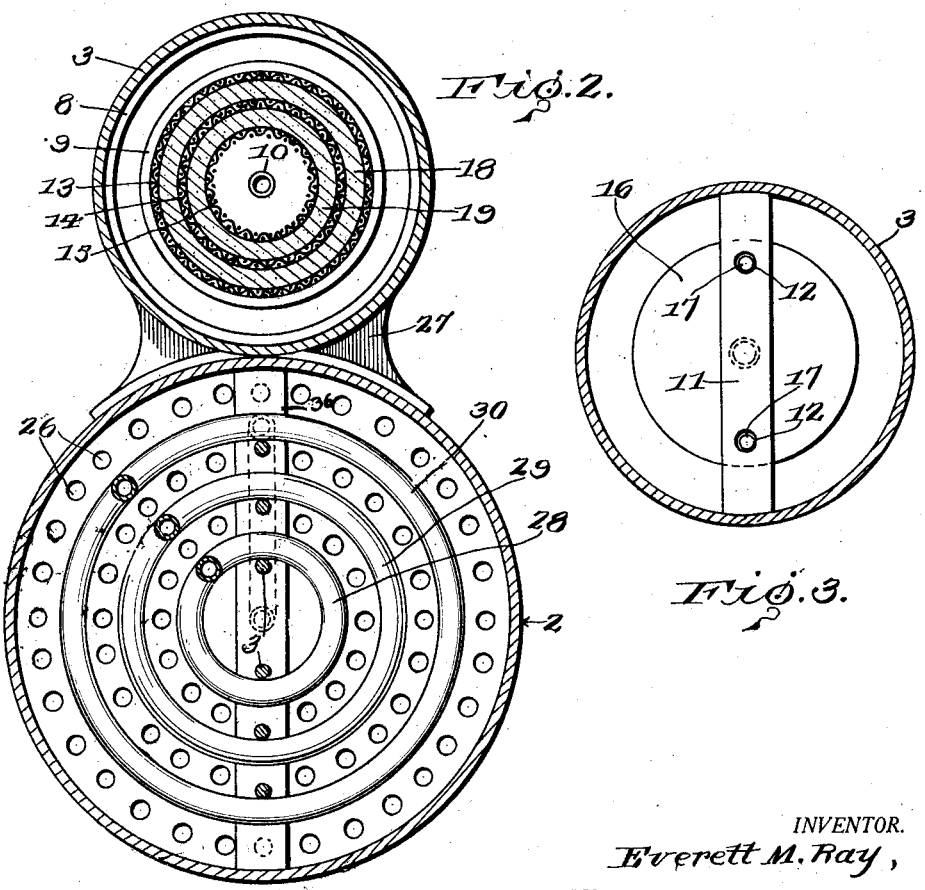
INVENTOR.
Everett M. Ray,
BY
Geo. F. Kimmel ATTORNEY.

Patented Oct. 22, 1929

1,732,986

UNITED STATES PATENT OFFICE

EVERETT M. RAY, OF FLINT, MICHIGAN

OIL-COOLING DEVICE

Application filed April 1, 1927. Serial No. 180,238.

This invention relates to a combined oil filtering and cooling device for use in connection with internal combustion engines of motor vehicles and has for its object to provide, in a manner as hereinafter set forth, a simple light, strong, durable, and thoroughly efficient means for filtering and cooling the oil employed to lubricate the working parts of the engine of the automobile under such conditions resulting in increased mileage.

With the foregoing and other objects in view the invention consists of the novel construction, combination and arrangement of parts as hereinafter more specifically described and illustrated in the accompanying drawings wherein is shown an embodiment of the invention, but it is to be understood that changes, variations and modifications can be resorted to which fall within the scope of the claims hereunto appended.

In the drawings wherein like reference characters denote corresponding parts throughout the several views:

Figure 1 is a longitudinal sectional view of a combined oil filtering and cooling device in accordance with this invention.

Figure 2 is a cross sectional view thereof.

Figure 3 is a fragmentary view in cross section of the filtering element of the device.

A combined oil filtering and cooling device, in accordance with this invention comprises a filtering element and a cooling element arranged in superposed relation and indicated generally by the reference characters 1, 2 respectively.

The filtering element 1 consists of a hollow cylinder 3 of appropriate diameter having at one end thereof an integral head 4 formed with openings 5, 6. The inner end of the cylinder 3 is closed by a removable head 7 having an inwardly extending peripherally threaded flange 8 for detachable engagement with threads formed on the inner face of the cylinder 3. The removable head 7, has its inner face formed with an inwardly extending integral annular flange 9 which is positioned a short distance from the flange 8. The head 7 is furthermore formed centrally thereof with an opening 10 having the wall thereof threaded.

Secured within the cylinder 3, in proximity to but spaced from the head 4 is a diametrically extending supporting bar 11 of appropriate width and which is provided with a pair of spaced openings 12.

Mounted within the cylinder 3 is a series of filtering members 13, 14 and 15 which are arranged concentrically with respect to each other, as well as being spaced apart. Each of said filtering members is in the form of a shell constructed from foraminous material, such as a wire screen. The filtering members extend from a circular disk 16 of materially less diameter than the inner diameter of the cylinder 3 and which is approximately the diameter of the outer filtering member 13. The disk 16 is provided with a pair of studs 17 which extend through the openings 12 whereby the disk 16 is supported from the bar 11. The filtering members have their inner ends secured to the disk 16 and positioned between the members 13 and 14 is a filtering cloth 18 extending from one end to the other end of said members and positioned between the filtering members 14 and 15 is a filtering cloth 19 which extends from one end to the other end of the members 14, 15. The outer ends of the filtering members and filtering cloths abut against the removable heads 7 and the outer filtering member 13 is surrounded by the flange 9. The diameter of the filtering member 13 with respect to the inner diameter of the cylinder is such as to provide a relatively wide space therebetween. The filtering members are of less length than the length of the cylinder 3 and have the inner ends thereof spaced from the head 4 by the supporting bar 11. The filtering cloths are removable whereby if one becomes damaged a new one can be conveniently replaced therefor. The filtering members are of the desired tension to provide for tightly clamping the filtering cloths therebetween. The oil feed line leading to the filtering element 1 is indicated at 20 and is provided with a valve 21. The line 20 is secured in the opening 10. The oil discharge line leading from the filtering element 1 is indicated at 22 and is secured in the opening 6. A valve 23 is secured in the opening 5 the purpose of which is to ascertain if oil is passing through the filter.

The oil is conveyed by pressure of the pump of the motor vehicle to the filter and through the cooler.

The cooling element 2 comprises a hollow cylinder 24 having its forward end 25 open and its rear end closed by a perforated head 26. The cooler 24 is of materially greater diameter and length than the diameter and length of the cylinder 3 and the latter includes a base piece 27 which is connected to the top of the cylinder 24 at the forward end thereof. Extending lengthwise of and arranged within the cylinder 24 is a central cooling coil 28, an intermediate cooling coil 29 and an outer cooling coil 30 which surrounds the coil 29. The coils are arranged in spaced relation and extend from a point in close proximity to the open end 25 to a point a short distance from the other end of the cylinder. The oil conducting line 22 opens into the forward end of the coil 28 and the rear end of the coil 30 is provided with a lead off pipe 31 which extends through the perforated rear end 26 of the cylinder 24.

Extending lengthwise of the cylinder 24 are a pair of supporting bars 32 for the coil 28, a pair of supporting bars 33 for the coils 29 and a pair of supporting bars 34 for the coil 30. The supporting bars maintain the coils in spaced relation, as well as supporting them and said bars are mounted in diametrically disposed spaced supports 35, 36 and 37 which are secured within the cylinder 24. The bars extend through the support 36 and have their ends secured to the supports 35 and 37. The supports 35, 36 and 37 extend through the coils.

The device is placed on the side of the engine, next to the fan, allowing air to pass from the fan through the cooler thereby cooling the oil to a sufficient temperature resulting in increased mileage. The apertured end of the cylinder 24 provides for circulation of air from the fan through the cylinder. The oil line 31 carries the oil back to the distributor of the engine.

It is thought the many advantages of a combined oil filtering and cooling device, in accordance with this invention for the purpose set forth can be readily understood and although the preferred embodiment of the invention is as illustrated and described, yet it is to be understood that changes in the details of construction can be had which will fall within the scope of the invention as claimed.

What I claim is:

1. In a lubricant cooling device for motor vehicle engines, a cylinder having an open forward end and adapted to be arranged in proximity to the fan of a motor vehicle for the admission of air directly from said fan and further having a perforated rear end for the discharge of such air, concentrically arranged coils extending lengthwise of said cylinder and having means for communication with a lubricant supply.

2. In a cooling device for the purpose set forth a cylinder having its forward end open for the entrance of a cooling medium and its rear end perforated for the discharge of such medium, communicating, concentrically arranged coils extending lengthwise of said cylinder and with the inner coil having means for communication with an oil supply, the outer coil having an oil discharge means, combined supporting and spacing bars for said coils extending lengthwise of said cylinder, and arranged in pairs and supports for said bars, said supports respectively extending diametrically of the cylinder at either end thereof and at the transverse median thereof.

3. In a cooling device for the purpose set forth a cylinder having its forward end open for the entrance of a cooling medium and its rear end perforated for the discharge of such medium, communicating, concentrically arranged coils extending lengthwise of said cylinder and with the inner coil having means for communication with an oil supply through the open end of the cylinder, the outer coil having an oil discharge extending through the rear end of the cylinder axially thereof, an inner, an intermediate and an outer pair of longitudinally extending bars, each pair for supporting a coil, said pairs of bars maintaining the coils in spaced relation, and spaced opposed supports disposed diametrically of the cylinder and common to said pairs of bars, said bars extending through said supports.

In testimony whereof I affix my signature hereto.

EVERETT M. RAY.